United States Patent
Abson et al.

(10) Patent No.: US 12,242,434 B2
(45) Date of Patent: *Mar. 4, 2025

(54) REDUCING RELIANCE ON CONTENT MANAGEMENT SYSTEM RESOURCES IN A CONTENT MANAGEMENT SYSTEM

(71) Applicant: Hyland UK Operations Limited, Maidenhead (GB)

(72) Inventors: Will Abson, Maidenhead (GB); Gethin James, Maidenhead (GB)

(73) Assignee: Hyland UK Operations Limited, Maidenhead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,241

(22) Filed: Dec. 22, 2022

(65) Prior Publication Data

US 2023/0185779 A1    Jun. 15, 2023

Related U.S. Application Data

(63) Continuation of application No. 15/352,431, filed on Nov. 15, 2016, now Pat. No. 11,567,910.

(51) Int. Cl.
*G06F 16/21* (2019.01)
(52) U.S. Cl.
CPC ................... *G06F 16/212* (2019.01)
(58) Field of Classification Search
None
See application file for complete search history.

(56) References Cited

U.S. PATENT DOCUMENTS

| | | | |
|---|---|---|---|
| 9,418,085 B1 | 8/2016 | Shih et al. | |
| 10,504,048 B2 | 12/2019 | Beck et al. | |
| 10,599,678 B2* | 3/2020 | Kapoor | G06F 16/211 |
| 2004/0199517 A1 | 10/2004 | Casati et al. | |
| 2005/0273460 A1 | 12/2005 | Abrams et al. | |
| 2008/0288629 A1* | 11/2008 | Fisher, III | G06Q 30/02 709/224 |
| 2009/0300043 A1 | 12/2009 | MacLennan | |
| 2011/0087516 A1 | 4/2011 | Frieden et al. | |
| 2011/0307603 A1 | 12/2011 | Ishikawa | |
| 2012/0036109 A1 | 2/2012 | Blazejewski et al. | |
| 2012/0095984 A1 | 4/2012 | Wren-Hilton et al. | |
| 2013/0081056 A1 | 3/2013 | Hu et al. | |
| 2015/0100582 A1 | 4/2015 | Xi et al. | |
| 2015/0317361 A1 | 11/2015 | Battaglia et al. | |
| 2016/0292219 A1 | 10/2016 | Prabhakar | |

(Continued)

*Primary Examiner* — Sanjiv Shah
*Assistant Examiner* — Ranjit P Doraiswamy
(74) *Attorney, Agent, or Firm* — Eschweiler & Potashnik, LLC

(57) ABSTRACT

An analytics engine is described that can receive data associated with use of a content item in a content management system and measure a use of content management system resources required to maintain the content item. Values of a usage metric can be assigned to the content item based on the received data associated with the use of the content item. A database schema can be generated by the analytics engine that is configured to reduce the use of content management system resources required to maintain the content item. The database schema can be provided to the content management system for implementation in a database associated with the content management system.

19 Claims, 6 Drawing Sheets

(56) References Cited

U.S. PATENT DOCUMENTS

| | | |
|---|---|---|
| 2016/0351189 A1 | 12/2016 | Miller et al. |
| 2017/0091400 A1 | 3/2017 | Richards et al. |
| 2017/0116307 A1 | 4/2017 | Kapoor et al. |
| 2017/0142578 A1 | 5/2017 | Puri et al. |
| 2017/0193016 A1* | 7/2017 | Kulkarni ............... G06F 16/288 |
| 2017/0193039 A1 | 7/2017 | Agrawal et al. |
| 2017/0272336 A1* | 9/2017 | Johnstone ........... H04L 43/0817 |

* cited by examiner

REDUCING RELIANCE ON CONTENT MANAGEMENT SYSTEM RESOURCES IN A CONTENT MANAGEMENT SYSTEM

CROSS-REFERENCE TO RELATED APPLICATIONS

This application is a continuation of and claims priority to the earlier filing date of U.S. patent application Ser. No. 15/352,431, filed on Nov. 15, 2016, the content of which is hereby incorporated by reference herein in its entirety.

TECHNICAL FIELD

The subject matter described herein relates generally to content management systems and to obtaining multi-dimensional reports and analytics based on data generated by events that occur on content management systems.

BACKGROUND

Enterprise content management (ECM) covers a broad range of applications, including document management (DM), Web content management (WCM), records management (RM), digital asset management (DAM), search of managed content, and the like. A content management system (CMS) suitable for managing the various content (also referred to herein in some examples as "files" or "documents") that an enterprise produces or generates, retains or otherwise stores, manipulates or modifies, etc. can support the requirements of one or more of such applications, and optionally other requirements, to provide a coherent solution in which content processes, management processes, and the like are capable of accessing content across a variety of applications subject to access controls, permissions, and the like. Content managed by a CMS can include one or more of documents, images, photos, Web pages, records, XML documents, other unstructured or semi-structured files, etc. Content retained in a CMS can also include directory structures such as folders, file trees, file plans, or the like, which can provide organization for multiple content items in addition to storing or otherwise representing relationships between content item, etc. An "enterprise" can generally refer to an organization, such as for example a business or company, a foundation, a university, or the like, and can have content requirements related to one or more business processes, content uses, etc.

A CMS manages the actual digital binary content, the metadata that describes a context of each content item, associations between a content item and other content or content items, a place and classification of a content item in a repository, indexes for finding and accessing content items, etc. The CMS can also manage processes and lifecycles of content items to ensure that this information is correct. The CMS can also manage one or more workflows for capturing, storing, and distributing content, as well as the lifecycle for how long content will be retained and what happens after that retention period.

A CMS for use in enterprise content management can include one or more of document management tools, applications, and interfaces to support general office work, search, and discovery. Workflow management capabilities of a CMS can support numerous business processes, optionally including, but not limited to, case management and review and approval. Collaboration applications and services of a CMS can support the collaborative development of information and knowledge in the creation and refinement of content and documents. This collaborative development of information and knowledge can be achieved through providing access to content managed by the CMS to multiple users. To prevent conflicting or discontinuous editing streams, a user can be allowed to check out or lock content for modification and check in the modified content such that other users are prevented from editing content concurrently. Web content management services of a CMS, which can be scalable, can support the delivery and deployment of content from the enterprise to its customers. Records management capabilities of a CMS can capture and preserve records based upon government-approved or other standards. A standards-based platform can also provide access to applications that use these standards, such as publishing, image management, email management, etc.

SUMMARY

As discussed in greater detail below, features of the current subject matter can enable the seamless access of content items managed by a CMS when viewing business information and business analytics reports about the content items. Reports associated with events occurring in a CMS can be generated. The events can relate to content items managed by the CMS, the status of the CMS, Business Process Applications, activities associated with the CMS, or the like. Reports can be a product of an analytics engine. Performing analytics on events associated with the CMS can be processor-intensive and therefore, if performed by the CMS, can reduce performance of the CMS. Consequently, analytics on the CMS is typically performed by an analytics engine that is separate from the CMS. Separating the analytics engine from the CMS facilitates improved performance in both elements, but introduces barriers when a user attempts to interact with both simultaneously. Features of the current subject matter can support multi-dimensional reporting analytics of activity associated with a CMS while facilitating access to the CMS through the reports generated by an analytics engine.

In one aspect, a computer-implemented method for implementation by one or more data processors forming part of at least one computing device, is provided. The method can include one or more operations. In some variations, data associated with use of a content item in a content management system can be received at an analytics engine. The analytics engine can measure, based on the received data, a use of content management system resources required to maintain the content item managed by a content management system. Maintaining the content item can include at least storing the content item in a database and processing the content item in response to interactions with one or more application processes operating on the content management system, or the like. Values of a usage metric can be assigned to the content item based on the measured use of content management system resources. The usage metric can provide an indication of the content management system resources required to maintain the content item. A database schema for a database of the content management system can be generated. The database schema can be defined based on the use of the content item and the values of the usage metric assigned to the content item and configured to reduce the use of content management system resources required to maintain the content item. The database schema can be implemented in the database of the content management system.

In some variations, the database schema can facilitate access to the content item based on the usage metric assigned to the content item. The database schema can be configured to increase the efficiency of access to the content item having a usage metric indicative that the content item requires increased content management system resources to be maintained compared to other content items maintained by the electronic content management system.

The usage metric associated with a content item can provide an indication of an entity that created the content item. The content management system resources can include computer resources, human resources, or the like.

In some variations, the operations can further include, at least, measuring the usage, of the content item, by a user group consisting of a group of users. The group of users may have one or more user characteristics in common, or one or more shared characteristics. In some variations, the shared characteristic can include one or more of a location of the users, a rank of the users, a role of the users, or the like.

A user group database schema can be generated for the content item based on the usage of the content item by the user group.

The database schema can cause the generation of tables that include foreign keys linking to tables of the database. The foreign keys can be row-specific.

Implementations of the current subject matter can include, but are not limited to, methods consistent with the descriptions provided herein as well as articles that comprise a tangibly embodied machine-readable medium operable to cause one or more machines (e.g., computers, etc.) to perform operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise software system or other content management software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
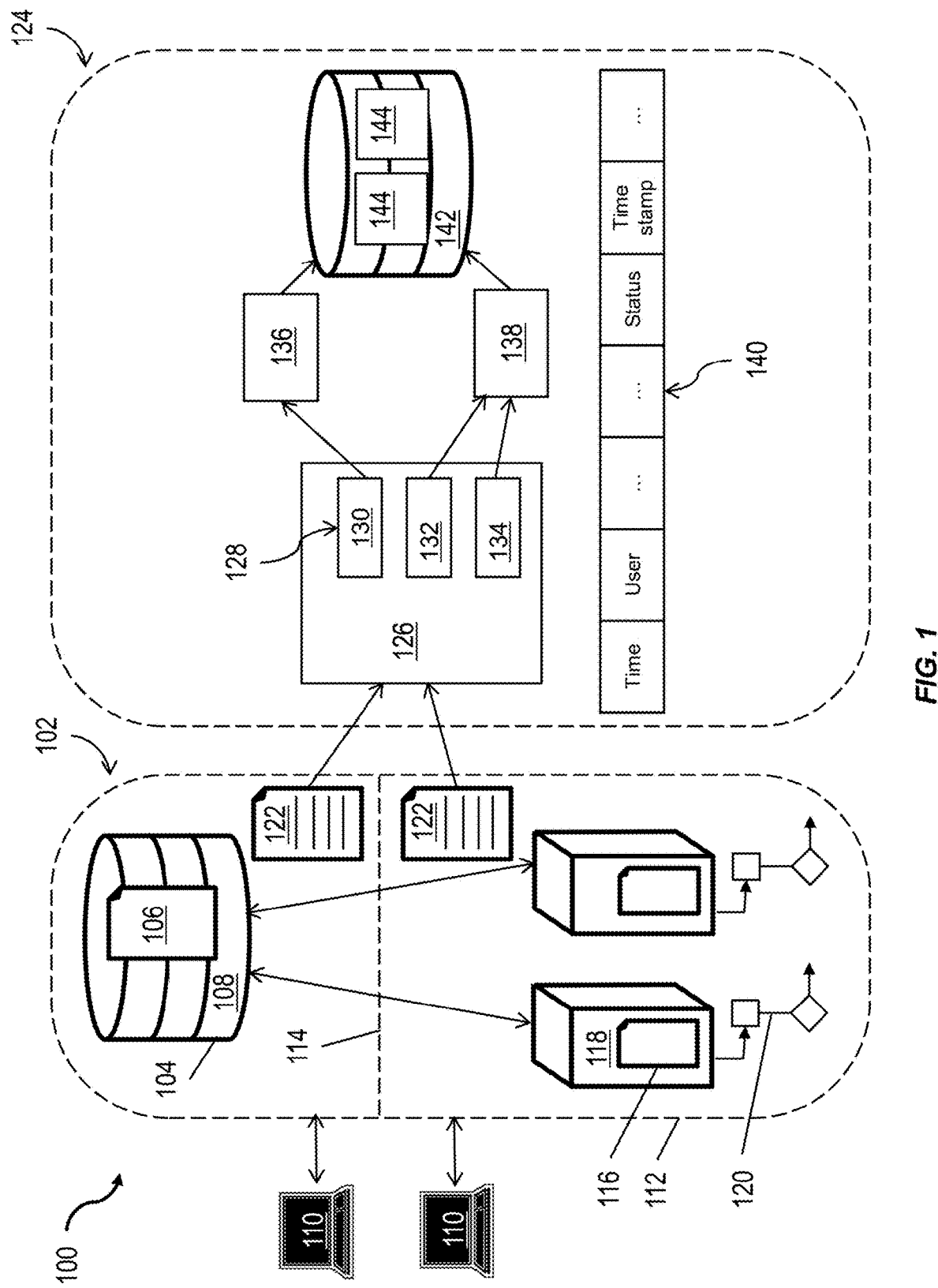
FIG. 1 shows a diagram illustrating elements of an ECM architecture having one or more elements consistent with the present description.

ECM architectures are generally business critical systems. As such, it is important for operators of ECM architectures to monitor and analyze the status of the ECM to detect system failures and/or head-off system failures before it causes impact on the business.

Different organizations can use ECM architectures in different ways. The ECM architecture can include a content management system configured to maintain one or more databases. The databases can have a database schema configured to store data in a configuration determined to facilitate efficient access to and/or analysis of database information. The database schema can be configured to provide efficient access to and/or analysis of database information for an average organization. When different organizations use ECM architectures differently, a single default database schema may not be as efficient for one organization as it is for another.

ECM architectures can be used to maintain content items. The use of the ECM resources required to monitor and analyze the ECM items so as to maintain and manage the ECM items can be analyzed to determine a database schema for a particular organization that is configured to provide efficient management of content items for the particular organization. The present description relates to developing and implementing a database schema for an organization without intervention by a computer programmer or database administrator.

To monitor the state of an ECM, logs can be created associated with the ECM architecture or components of the ECM architecture. Logs can be generated in response to a PRINT command at the end, or during, the execution of a process. The logs may then be analyzed to determine the occurrence of a failure or predict a future failure of the ECM architecture. Waiting for logs to be generated in this manner requires that the process that includes the PRINT command complete before the log, or log-line, is generated.

The present description describes generating information associated with events occurring within an ECM architecture without the need to wait for formal logs to be generated at the ECM architecture. The event information can be translated into log files for further analysis. The event information can include information associated with content items stored using the ECM architecture, business processes associated with the ECM architecture, user interactions with the ECM architecture, and/or other events. This event information can be generated without waiting for the completion of the event.

The log file generated by the events taking place within the ECM architecture can itself be translated into an analytics engine. The analytics engine can facilitate the generation of a unified view of the events occurring in the ECM architecture. The unified view can provide an indication of failures within the ECM architecture and/or facilitate the determination of future failures within the ECM architecture.

The analytics engine can be configured to generate a schema based on the event data.

The analytics engine can be configured to generate reports that distinguish between individual pieces of content or content repository artifacts, maintained by the ECM, for example, sites, folders, groups, or the like. The reports can be generated from the schema generated based on the event data. The analytics engine can facilitate the generation of reports that facilitate click through and access of content and/or content artifacts. The generated reports can facilitate provision of relevant actions associated with the content, provide information associated with the content, such as metadata associated with the content, provide the binary associated with the content, or the like.

In some variations, the analytics engine can be configured to generate a database schema based on the generated reports. The generated reports can provide information regarding the use of content items and ECM resources. The generated database schema can be based on the use of the content items and the ECM resources and is designed to increase the efficiency of the ECM architecture.

The database schema can include one or more dimensions. The one or more dimensions of the database schema can be associated with one or more attributes relating to the use of the ECM architecture. The one or more dimensions, which represent use attributes, can be used to determine an optimal database schema for a particular organization based on that organization's use of the ECM architecture.

The analytics engine can be configured to facilitate generation of an interactive analysis interface. The analytics engine can be configured to facilitate presentation of an interactive analysis interface on a display device of a client device. The analytics engine can be configured to facilitate user interaction through the interactive analysis interface with content and/or information associated with the content. The interactive analysis interface can be configured to facilitate on-demand analysis of content across multiple dimensions of the ECM system.

The analytics engine can be configured to facilitate storage of the generated reports into the content repository. The generated reports stored in an individual content repository can be associated with the content and the users of that content repository. The generated reports can facilitate providing insight into use of the content repository including user usage patterns of content in the content repository.

The analytics engine can be logically separate from the CMS. Having the analytics engine separate from the CMS can facilitate generation of a unified view of the CMS and/or the ECM without impacting the functionality of the CMS and/or ECM. Reports can be generated by the analytics engine associated with the events occurring in the ECM architecture. In some variations, the reports can be associated with content items maintained by the CMS. Where the analytics engine is separate from the CMS and/or ECM, the user may be required to separately access the analytics engine and the ECM system to view the reports and also view the content items referenced by the reports.

The present disclosure describes computer programs, methods, and/or systems for facilitating generation of database schemas for ECM architectures based on an analysis of the use of the ECM architectures, and thereby increasing the efficiency of the ECM architecture.

FIG. 1 shows a diagram 100 illustrating features of an ECM architecture 102 consistent with implementations of the current subject matter. The ECM architecture 102 can include a CMS architecture 104 consistent with implementations of the current subject matter. A CMS 104 can generally include at least one programmable processor executing some form of machine-readable instructions (e.g. software code, etc.) to provide one or more content management functions. In some variations, the CMS 104 can be cloud-based. The cloud-based CMS can include cloud-based repository. The cloud-based CMS can be isolated to provide access only to authorized users of a specific location within the cloud-based installation.

A typical enterprise may own or otherwise manage or have custodial responsibility for content 106 subject to a range of access controls. Some content 106 of the enterprise may be freely sharable, while some other content 106 may be highly confidential or otherwise subject to security control. However, a third type of content 106 of the enterprise may exist somewhere between these two extremes.

Currently available approaches to enterprise content management generally do not include capabilities relating to the capture, analysis and reporting of events that occur within the CMS 104. It is typical for content 106 that is managed by a CMS 104 of an enterprise to be stored on electronic storage 108. In response to a user accessing the content 106, the CMS 104 can be configured to lock the content 106 from further edits by other users. If a another user attempts to accesses the content 106 and make modifications, the other user can be prohibited from accessing the content 106, can be prompted that the content is locked to editing, and/or can cause the content modified by the other user to be saved as another version of the original content 106 In some variations, where content 106 is locked, or "checked out," other users are prohibited from both saving over the content 106 stored in electronic storage 108 and from saving the modified content as another version of the content 106. The original user can save any modified content over the original content 106 or cause the modified content to be saved as a new version of the original content 106.

Services and controls for managing content of a CMS 104 consistent with implementations of the current subject matter can include features such as metadata management, version control, lifecycle management, workflow, search, associations to other content, tagging, commenting, etc. that allow users of the CMS 104 to find desired content items among very large content collections that can span multiple parts of an enterprise. Accuracy and consistency of the information can also be ensured, even for very large content collections across an enterprise. Content and other information in a CMS 104 can be presented, published, etc. through the Web or any other channel appropriate to allow users to access that information.

In addition to supporting features typical of a cloud-based or "software as a service (SaaS) software delivery model, a synchronization scheme consistent with the descriptions provided here can provide a number of desirable features. For example, the current subject matter can support automatic synchronization of content between one or more CMS-managed repositories that are inside of a firewall and a copy of one or more content items that are made accessible to authorized collaborating users of the collaboration site in the cloud. Such features can enhance ease of engagement and collaboration both between users within an organization and other collaborating users who are external to the organization.

Users can be associated with user devices 110. Users can access the CMS 104. Users can access content 106 managed and maintained by the CMS 104 after being authenticated. In some examples, authentication can be established through interaction of the user with one or more user interface elements, such as for example a window, navigation pane, or other display feature including one or more user interface elements, an inline prompt, etc. The interface element(s) can be managed by the ECM 102 and/or the CMS 104. The user(s) can be internal users or external users. Internal users can be users that are within a firewall 112. Internal users can be within a firewall managed by the ECM 102 and/or can be within a firewall managed by the CMS 104. External users may be required to seek authorization to access programs and systems that are within the firewall 112. A firewall 112 can exist within an ECM 102 between various components and areas of an ECM 102. For example, a firewall 114 can exist between the CMS 104 and one or more servers configured to provide additional functionality to the ECM 102 and/or the CMS 104.

The term firewall is generally used throughout this disclosure to refer to network security controls, features, functionality, etc. that restrict access to users outside of the firewall to content retained on one or more repositories inside of that firewall.

The user(s) can be requested to supply authentication credentials on at least a first request to set up a synchronization between a content item held within the firewall-protected installation of the content management system, and the authentication credentials can be saved, for example in a secure credentials store or the like for future synchronization actions. Optionally, the authentication credentials can be checked for accuracy when they are entered to prevent, for example, an incorrect password, username, or other credentials, from being saved in the secure credentials store. In some examples, an implementation or the like can be used to establish authentication of the user(s).

The ECM 102 and/or the CMS 104 can include a permissions log. When a user attempts to access the ECM 102 through the firewall 112, a determination of whether the user can access the ECM 102 and/or the CMS 104 can be determined. Once within the firewall 112, or if the user originated from within the firewall 112, a determination can be made as to whether the user has permission to perform each of the tasks or activities requested by the user. The permissions log can include a list of users of the ECM 102 and their respective permissions. The permissions log can include information as to the access rights of users to content items 106, business process applications (BPAs) 116, and the like. While a permissions log is described, the present description contemplates multiple permissions logs. In some variations, each content item 106 or BPA 116, for example, can include its own permissions log.

Consistent with some aspects of the current subject matter, one or more dynamically configurable business process applications (BPAs) 116 can be supported within an installation of an ECM architecture 102. In some variations, one or more dynamically configurable BPAs 116 can be supported within an installation of a CMS 104. A BPA Server 118 can manage and maintain the BPA(s) 116.

As referred to herein, a BPA 116 can be based on an application model definition (AMD), which can define functionality for guiding one or more users through a set of actions consistent with completion of an instance of a business process (or other structured arrangement of activities, tasks, etc.). The set of actions can include either or both of tasks requiring interactions of one or more human users of CMS 104 and automated actions (e.g. actions performed by a system without direct human interaction). A BPA 116 can be used multiple times for discrete "workflow instances" (also referred to as "execution instances") of a business process or part of a business process supported by the BPA 116.

Dynamically configurable, customizable BPAs 116 such as those described herein can guide workflow instances based on a current context of one or more users, documents (or other content items), systems, etc. This guidance can be provided via a user-interface defined by the BPA being executed as part of a workflow instance, which can in turn be part of a case. As discussed in greater detail below, a BPA 116 can optionally be initially configured using an application development user interface (ADUI), and can itself include user interface features that promote collaboration and information access among multiple users involved in a content management-based business process. Some variations of the current subject matter include hybrid BPAs 116, which can be configured to execute from one CMS installation while being able to access content on a second CMS installation, even if the second CMS installation is behind a firewall. In this way, a BPA 116 can be a Web application, which can access both content maintained at a first, cloud-based CMS repository and content maintained at a second, on-premise CMS repository. Synchronization of workflow actions, content, and case data relating to execution of one or more workflow instances can readily occur between the CMS repositories of the two CMS installations. (UI-based BPM apps based on suggestions derived from previous BP instances, content-specific events driving workflow states)

An AMD can be constructed using an ADUI, such as for example an ADUI having one or more of the features further discussed below. An AMD can serve as a modeled framework for one or more BPA variations. For example, an AMD can be directed to a business process for content creation, modification, approval, and execution, such as a business process relating to generation, revision, review, signing, archiving, etc. of a contract. Other examples of AMDs can include collaboration applications, records management applications, and the like.

A BPA 116 based on an AMD can be defined with greater specificity to tailor the BPA to reflect details of one or more business processes specific to a sub-organization of the enterprise (e.g. a legal department, a human resources department, etc.) or to some other organization, for a different specific purpose, etc. As used herein, a BPA 116 refers to a variation, version, instance, etc. of an application model (defined by an AMD), which can be further refined or defined based on one or more expected use criteria, such as for example a target audience that will use the BPA 116, a specific set of custom actions related to tailoring the BPA 116 to a target use, or the like. As an example, a contracts application model can be provided. The contract application model can be deployed as a legal contracts BPA, a human resources contracts BPA, a real estate contract BPA, or the like, based on the target audience. As discussed further below, a BPA 116 can also be dynamically configurable such that user actions in response to guidance provided by the BPA 116 during a workflow instance based on the BPA 116 can deviate from the guided or recommended actions as defined in the BPA 116. Such user actions can also impact guidance provided by the BPA 116 in the course of subsequent workflow instances based on the BPA 116. In some examples, a user can save a modified or new BPA based on updated or altered guidance developed at least in part based on case data retained for one or more past workflow instances.

As used herein, a workflow instance refers to a specific instance or iteration of a set of actions guided by a BPA 116 for a specific document or set of documents. As an example, for a BPA 116 related to contract review, the review of a contract or a set of related contracts can constitute a workflow instance of the BPA 116.

Information associated with events occurring in the ECM 102 can be extracted using one or more processes. For example, an extract, transform, and load process can be used to extract information associated with events occurring in the ECM 102. The information associated with the events can include events associated with content items 106, business processes 116, and/or other elements of the ECM 102.

The information associated with events occurring within the ECM 102 can include events associated with content items 106 stored on the CMS 104. The CMS 104 can comprise electronic storage 108 configured to store and maintain the content items 106. Users can interact with the content items 106 through interaction with the CMS 104, through one or more intermediary applications, or the like. Different types of interaction with the content items 106 can be an event. For example, opening, modifying, saving, creating a new version, closing, deleting, moving, updating of the content item 106, or the like, can generate event information.

The information associated with the ECM 102 can include events associated with a BPA server 118. In some variations, users may not interact with the BPA server 118 or the BPA(s) 116 directly, but may interact with the BPA(s) 116 and/or BPA server(s) 118 through intermediary or third-party applications.

BPA(s) 116 can cause a business process(es) 120 to be executed. The business process(es) 120 can include multiple actions or transactions. Event information can be generated for each of the BPAs 116, the business process(es) 120 and/or for the individual actions or transactions that comprise the business process(s) 120.

Use of, or interaction with, BPAs 116 by users can generate multiple different types of event information. BPAs 116 may interact with content items 106 maintained by the CMS 104. Consequently, event information associated with the BPAs 116 and the content items 106 can be generated based on a single user interaction.

Event information can be generated based on the performance and/or functionality of the ECM 102 components. For example, the ECM 102 can comprise multiple software, firmware, and hardware components. Performance of, for example, a server of the CMS 104, a BPA server 118, a computing devices associated with users, or the like, can generate event information.

FIG. 1 includes a representation of event information 122 in the ECM 102. This event information 122 is conceptual only. The present description contemplates the event information 122 being transferred to an analytics engine 124 in response to the creation of the individual event information 122. In some variations, event information 122 may be generated from one or more sources at roughly the same time. This event information can be aggregated at the ECM 102 and transmitted to the analytics engine 124 together. In some variations, the event information 122 from separate sources and/or events is separately transmitted to the analytics engine 124.

The event information 122 associated with the occurrence of an event in an ECM 102 can be accepted by an analytics engine 124. The event information 122 can comprise one or more event topics having event topic types. The at least one of the one or more event topics can include serialized event data.

In some variations, a queuing mechanism can be used to transmit the event information 122 to the analytics engine 124. The queuing mechanism can be configured to deliver the event information 122 to the analytics engine 124 without impacting the performance of the ECM 102. In some variations, the queuing mechanism can be configured to provide the event information 122 to the analytics engine 124 in real-time or near-real-time. Such a queuing mechanism can facilitate delivery of event information 122 to the analytics engine 124 without having to wait for the underlying transaction to be completed.

The analytics engine 124 can comprise a broker 126. In some variations, the broker can include a JAVA messaging server. The event information 122 can be routed to the broker 126. The broker 126 can be configured to maintain data routing continuity by storing the event information 122 in a system memory. The event information 122 can be routed to the broker 126 in real-time or near-real-time.

The broker 126 can include one or more topics 128, or channels. The event information 122 can be binned into the one or more topics 128 based on the event information type. In some variations, the event information 122 can be tagged with an event type. The event type can be based on the source of the event information 122. For example, event information 122 emanating from an interaction with content items 106 maintained by the CMS 104 can include a CMS event type, event information 122 emanating from BPAs 116 can include a BPA event type, and the like.

Event types 128 can include activities 130, tasks 132, process 134, or the like. Activities 130 can include user-interactions with content items 106 maintained by the CMS 104. In some variations, processes 134 can be generated from tasks 132. The broker 126 can be configured to store the event information 122 in the different event type 128 categories, in memory.

The analytics engine 124 can include one or more agents. For example, the analytics engine 124 may include a first event listener 136 and a second event listener 138. The event listeners 136, 138 can be subscribed to one or more of the event type bins 128. The event listeners 136, 138 can be configured to extract, from the event-type bins 128 the event information 122. For example, the first event listener 136 may be an activity listener. The activity listener can be configured to subscribe to the activity topic 130. Event information binned into the activity topic bin can be extracted by the activity listener. The second event listener 138 may be a task listener. The task listener can be configured to subscribe to the task topic 132 and/or the process topic 134. Event information binned into the task topic bin and/or the process topic bin can be extracted by the task listener.

The broker 126 can be configured to separate the event information into one or more event topic bins 128. The separation can be performed by one or more message listeners. The one or more event topic bins can be based on the event topic type. The one or more message listeners can be configured to subscribe an event topic type.

The event information 122 stored in the event bins can include different event information elements 140. The event information elements 140 can include one or more of a time, user information, serialized data, status information, a timestamp, or the like. The serialized data can include event-type-dependent data. For example, if the event-type was a log-in, the serialized data may not include additional data. If the event-type was a download of a content item 106, the serialized data may include an identity of the content item, the site location of the document, the site location of the user downloading the content item, the file size of the content item, the format of the content item, etc. In some variations, the event information can be comprised of metadata.

In some variations the broker 126 can be configured to determine whether any of the stored event information 122 include a failure. The broker 126 can store the faulty event information 122 locally. The broker 126 can be configured to analyze and diagnose the fault with the faulty event information. In some variations, the broker 126 may store the fault event information until an administrator can review the fault event information. In some variations, the broker 126 may be configured to transmit an indication of the fault event information and/or information associated with the fault event information to an administrator computing device for review by an administrator.

The binned event information 122 and/or the fault event information can be stored in electronic storage. The analytics engine, for example, can include electronic storage 142. In some variations, electronic storage 142 can be associated with the broker 126. Electronic storage 142 can be collocated with one or more processors configured to provide the functionality of broker 126. In some variations, electronic storage 142 can be logically and/or physically separate from the one or more processors configured to provide the functionality of broker 126, for example as in a cloud storage system.

In some variations, the event listener agents 136 and 138 can be configured to write the binned event information to a staging database. The event information can be stored in the staging database, or staging area based on the one or more event topic types. The staging database can be maintained on electronic storage, for example, electronic storage 142. In some variations, the event information stored in the staging database can be stored in serialized form. The staging database can comprise staging database tables 144 for activities 130 and staging database tables 144 for tasks 132 and processes 134. The staging database tables 144 can be created real-time, or near-real-time, as events occur in the ECM 102.

Figure 2:
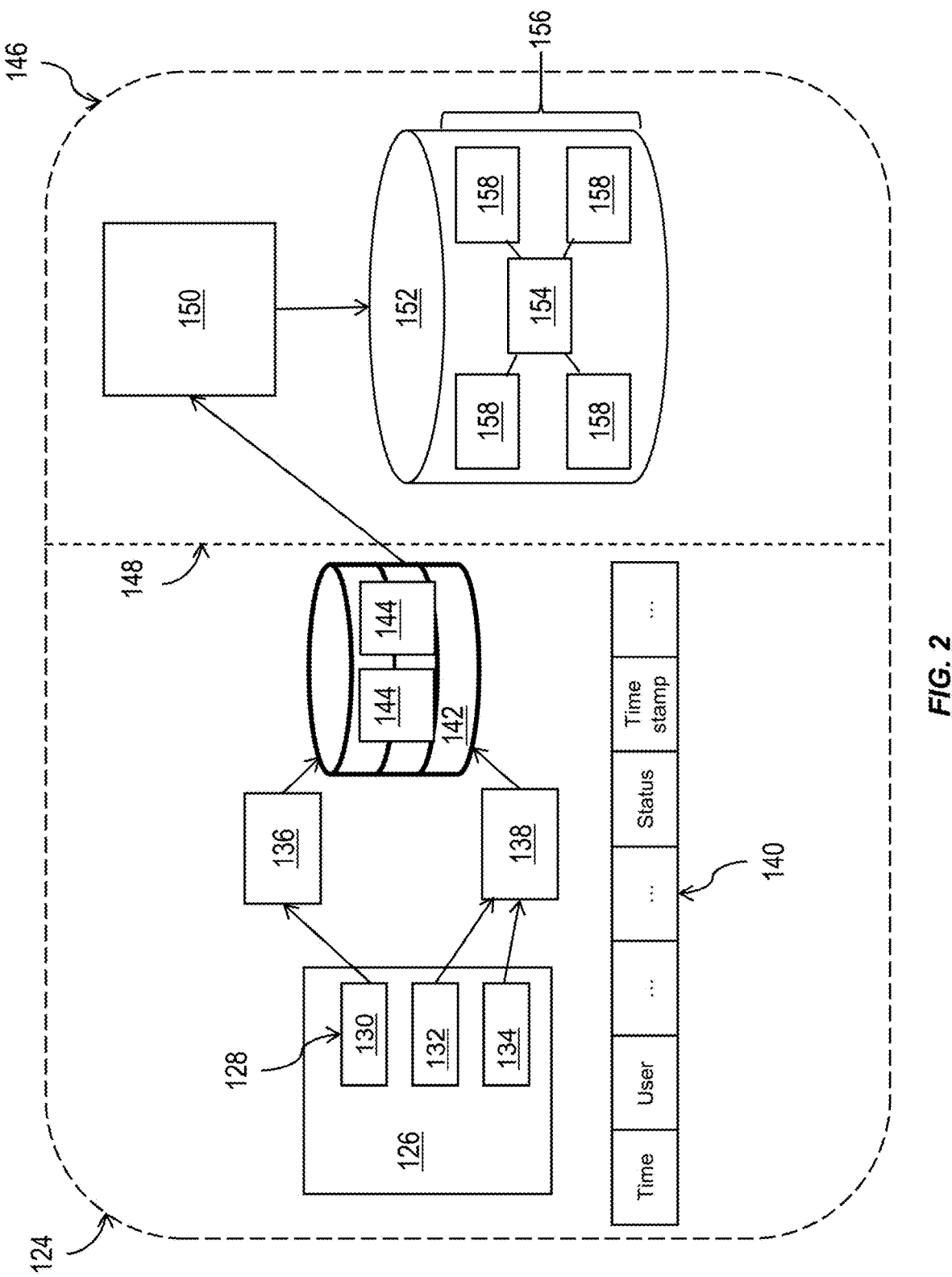
FIG. 2 is an illustration of an analytics engine having features consistent with the present description.

FIG. 2 is an illustration of an analytics engine 124 having features consistent with the present description. The event information binned by event topic and stored in the staging area database on electronic storage 142 may be transferred to a data analyzer 146. The data analyzer 146 may be logically and/or physically combined within the rest of the analytics engine. In some variations a system boundary 148 may be provided.

The data analyzer 146 may comprise a data integrator 150. The data integrator 150 can be configured to integrate the binned event information. The data integrator 150 may operate on an integration schedule. The integration schedule can be predefined by an administrator. For example, the data integrator 150 may operate every 2 minutes, every 5 minutes, every 10 minutes, or the like. The data integrator 150 can operator on any scheduled.

The data integrator 150 may be logically linked with an integration database 152. The integration database 152 may comprise one or more fact tables 154. The fact tables 154 may be arranged as a star schema 156. The fact tables 154 can reference any number of dimension tables 158. The fact tables 154 may include foreign keys referencing the dimension tables 158.

A star schema can be considered a style of data mart schema and is the approach most widely used to develop data warehouses and dimensional data marts. A data mart can be the access layer of the data warehouse environment that is used to get data out to the users. The data mart is a subset of the data warehouse and is usually oriented to a specific business line or team. Whereas data warehouses have an enterprise-wide depth, the information in data marts pertains to a single department. In some deployments, each department or business unit is considered the owner of its data mart including all the hardware, software and data. The star schema consists of one or more fact tables configured to reference any number of dimension tables. A fact table consists of the measurements, metrics or facts of an enterprise process. It can be located at the center of a star schema and be surrounded by dimension tables. Where there are multiple fact tables, they can be arranged as a fact constellation schema. Dimension tables. Dimension tables accompany fact tables that typically include the foreign keys which can refer to candidate keys (normally primary keys) in the dimension tables. Contrary to fact tables, dimension tables contain descriptive attributes (or fields) that are typically textual fields (or discrete numbers that behave like text). These attributes are designed to serve two critical purposes: query constraining and/or filtering, and query result set labeling. A star schema is an important special case of the snowflake schema, and is more effective for handling simpler queries.

In some variations, the integration database 152 can include one or more separate star schemas 156 for each event information type. For example, the integration database 152 can include a star schema 156 for activity-type event information, a star schema for task-type event information, a star schema for process-type event information, and the like.

The data integrator 150 may be configured to extract, transform and load the binned event information stored in the staging database. The data integrator 150 can be configured to process the unstructured serialized data 140 of the event information stored in the staging database into the structured star schema 156 stored on the integration database 152. The star schema can include primary key-based relationship between data-types. In some variations the data can go through a series of transformations in order to turn it into the structured format required to load it into the star schema.

In some variations, the data integrator 150 may be configured to obtain the binned event information from the staging database. The data integrator 150 may be configured to process the status information in each row of the staging database tables 144. The data integrator 150 can be configured to update the row with a timestamp providing the time at which the row was processed. The data integrator 150 can be configured, based on the timestamp information in each row of the staging database tables 144, to determine whether or not that row has been processed by the data integrator 150. In some variations, the data integrator 150 can be configured to overwrite the timestamp information in each row of the staging database table 144 that it processes.

The data integrator 150 can be configured to extract, transform and load data based on a desired set of information required to provide the reports desired by the operator of the ECM 102.

In some variations, the integration database 152 can be referred to as a data warehouse.

Figure 3:
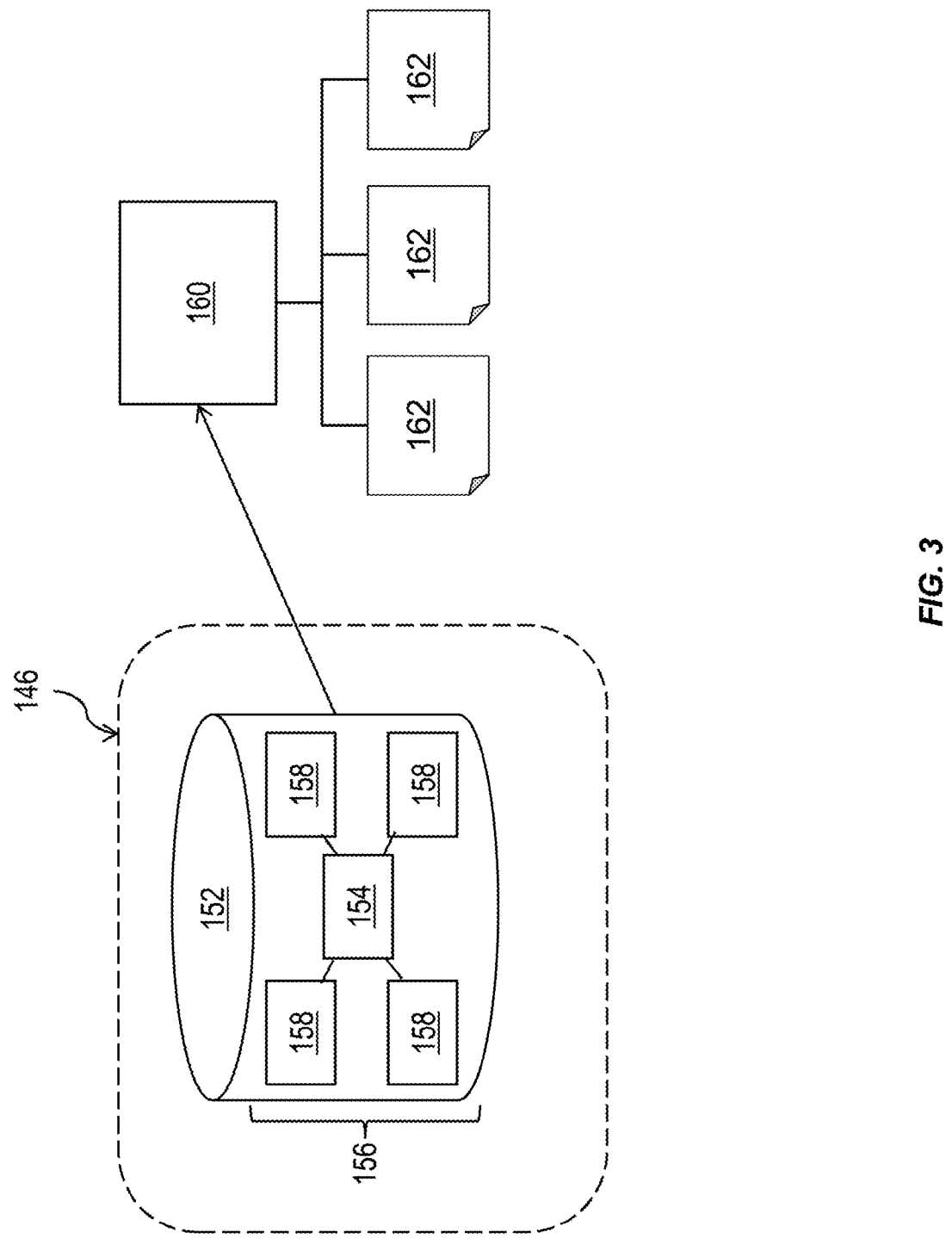
FIG. 3 is an illustration of an analytics engine having features consistent with the present description.

FIG. 3 is an illustration of an analytics engine having features consistent with the present description. The integration database 150, or data warehouse, can be in electronic communication with one or more analysis computing devices 160. The analysis computing device 169 can be configured to be operated by one or more analysts. In some variations, the analysis computing device(s) 160 can be a server. The server can be configured to be in electronic communication with the data warehouse. The server can be a business analytics server. The analysis computing device(s) 160 can be configured to provide business analytics reports 162 associated with the events occurring within the ECM 102.

As referred to herein, a content management system generally includes at least one programmable processor executing some form of machine-readable instructions (e.g. software code, etc.) to provide one or more content management functions. Alternatively or in addition, computer hardware can be configured to perform one or more of the operations or the like described herein. The term firewall is generally used throughout this disclosure to refer to network security controls, features, functionality, etc. that restrict access to users outside of the firewall to content retained on one or more repositories inside of that firewall. The term content is generally used throughout this disclosure to mean folders, files, director structures, or the like (also referred to herein as content items).

Various implementations of the current subject matter can, among other possible benefits and advantages, provide real-time, or real-near-time, business analytics information associated with events occurring on the ECM 102. Providing real-time or near-real-time business analytics information can, among other possible benefits and advantages, facilitate determination of faults within the ECM 102 as they arise, or near to when they arise, and/or facilitate determination of future possible faults within the ECM 102.

Various implementations of the current subject matter can, among other possible benefits and advantages, provide event information associated with both content items 106 and task and/or process information, simultaneously, facilitating system and content item analytics on both content items 106 and task and/or process information in real-time, or near-real-time.

Although the examples described herein refer to a CMS installation, an enterprise can maintain multiple CMS installations or collaborate with other enterprise CMS installations. The current subject matter can be configured to synchronize one or more of folders, files, directory structures, or the like, and business processes from a first installation of a CMS to a second CMS installation. Access restrictions on content items can be mirrored on the other CMS installations. Collaborations on content items can be facilitated between multiple on-premise users as well as users external to the premises at which the CMS installation is maintained. The variations of the subject matter described in this disclosure refer to two users modifying content simultaneously. This is for ease of explanation. The current subject matter contemplates multiple users concurrently modifying the content. The current subject matter can facilitate modification of the content by one, two, three, four, five or more users, or groups of users, concurrently.

Services and controls for managing content of a CMS consistent with implementations of the current subject matter can include features such as metadata management, version control, lifecycle management, workflow, search, associations to other content, tagging, commenting, etc. that allow users of the CMS to find desired content items among very large content collections that can span multiple parts of an enterprise. Accuracy and consistency of the information can also be ensured, even for very large content collections across an enterprise. Content and other information in a CMS can be presented, published, etc. through the Web or any other channel appropriate to allow users to access that information.

The term user is used throughout this disclosure to refer to a user of the system, a user terminal used by a user to access one or more elements of the system, or the like.

Figure 4:
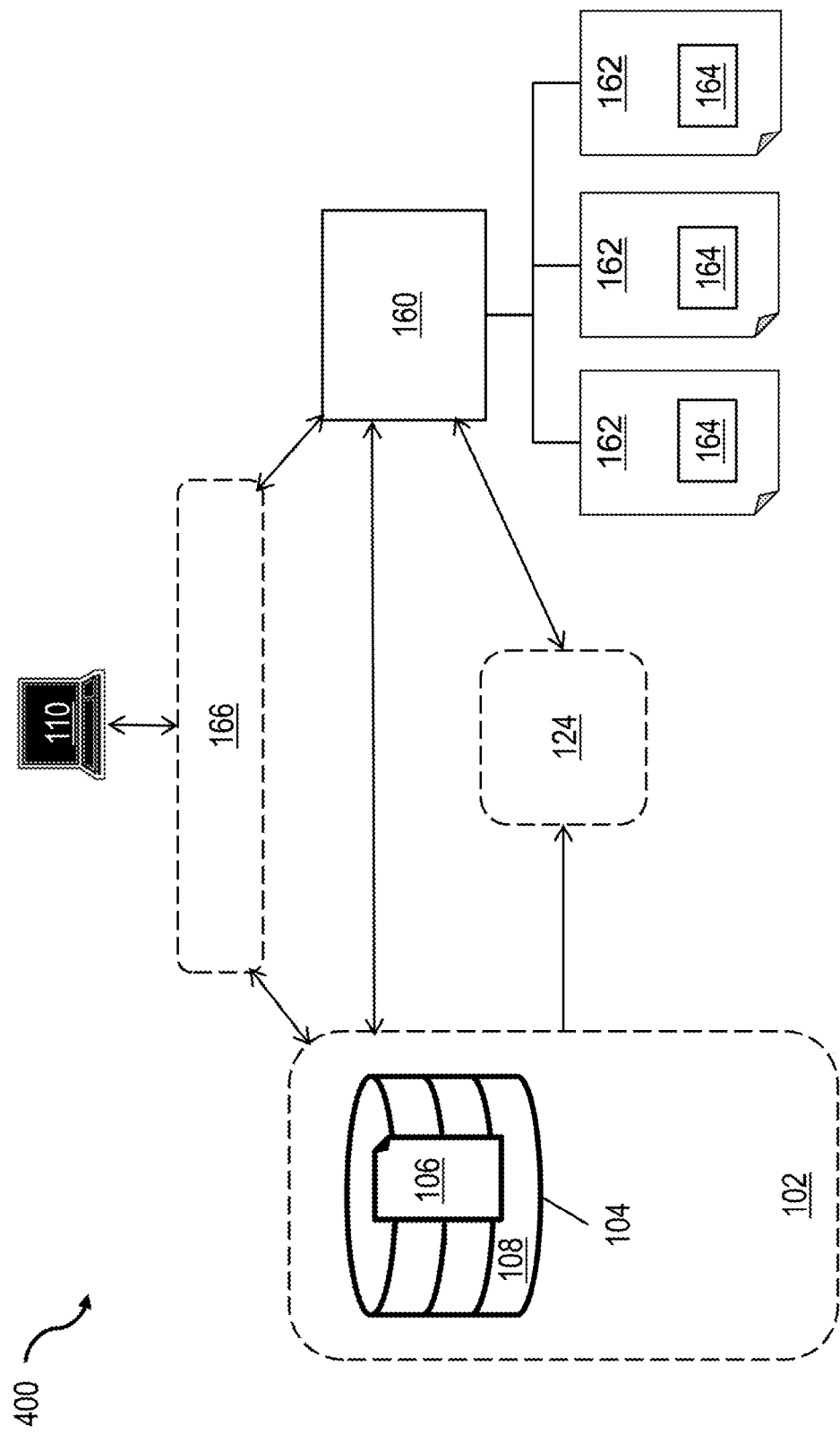
FIG. 4 is a schematic illustration of a system having one or more features consistent with the current subject matter.

FIG. 4 is a schematic illustration of a system 400, having one or more features consistent with the current subject matter. In one use case, a user can request access to content 106 stored on the data storage system 108 managed by the CMS architecture 104. In some variations, the CMS 104 can lock the content item 106 from being edited further by other users. The user can be presented with the content item 106 through a display of a user device associated with the user. The CMS 104 can require log-in credentials from the user.

In some variations, the user may request a report from an analysis computing device 160. The analysis computing device 160 can be configured to provide analytics reports 162 associated with events occurring within the ECM 102. In some variations, the user may access the analysis computing device 160 and/or analytics reports 162 directly. In other variations, the user may access the analysis computing device 160 through a centralized log-in system 166. The centralized log-in system 166 can facilitate access to various elements of the system 400 in a seamless manner as perceived by the user.

The centralized log-in system 166 can be hosted on a log-in server separate from the ECM 102 and/or the analysis computing device 160. The centralized log-on system can be hosted on the ECM 102, the analysis computing device 160, or both, and provide access to all elements of the system 400. The analysis computing device 160 can be configured to communicate directly with the ECM 102. The analysis computing device 160 can be configured to communicate with an event data warehouse, such as integration database 152. In some variations the analysis computing device 160 can access information stored on the integration database 152 through an analytics engine 124. In some variations, where the data analyzer 146 is separate from other components of the analytics engine 124, the analysis computing device 160 can communicate with the data analyzer 146 to access the information stored on the integration database 152. The integration database 152 can include one or more fact tables 154 configured to maintain data on events occurring in or associated with the ECM 102.

Events can include interactions, performance, and the like, of the ECM 102, components of the ECM 102, or the like. Events can include user interactions with the ECM 102, content managed by the ECM 102, modifications to user profiles, group profiles, or the like, or other ECM-related events.

The analytics reports 162 can include event links 164. The event links 164 can facilitate click-through access for a user viewing an analytics report 162 to access information associated with the event(s) that is the subject of the analytics report 162. In response to an interaction, by the user, with an event link 164, the subject of the event link 164 can be presented to the user. The subject of the event link 164 can be content 106 managed and maintained by the CMS architecture 104 of the ECM 102. The subject of the event link 164 can include the binary of the content 106, metadata associated with the content 106, or the like.

The analysis computing device 160 can be configured to generate an event report 162 comprising an event link 164. The event link 164 can include a link to the event that is the subject of the event report 162. The event link 164 can include a cryptographic key. The cryptographic key can be generated by the CMS 104. The cryptographic key can be shared with the analytics engine 124, the data analyzer 146, the analysis computing device 160, or the like. The cryptographic key can include an authorization to access the subject of the event. For example, where the event is content 106 stored on the data storage system 108 of the CMS 104, the cryptographic key can include an authorization, for the user, to access the content 106 on the data storage system 108. In some variations, the cryptographic key contained in the event link 164 can be a decryption key. In response to a user interacting with the event link 164, the content item 106 can be transmitted to the user device 110 of the user. The content item 106 can be encrypted. The user device 110 associated with the user, or the analysis computing device 160, can be configured to decrypt the content item 106 using the cryptographic key contained in the event link 164.

In some variations, the CMS 104 can be configured to encrypt the content item 106 prior to transmitting the content item 106 to the user device 110 associated with a user. In some variations, the CMS 104 can be configured to store the content item 106 in an encrypted state.

In some variations the cryptographic key contained in the event link 164 of the event report 162 can be a one-time-use cryptographic key. After the cryptographic key has been used to decrypt or access the content item 106, the cryptographic key cannot be used again to decrypt or access the content item 106. Should the event report 164 be shared with other users of the system 400, or other entities, other users or entities may not be able to view the content item 106 through the link.

The one or more fact tables 154, of the integration database 152, can reference dimension tables 158. An analysis computing device 160 can be configured to receive data associated with the use of content items and/or resources of an ECM 102. An analysis computing device 160 can be configured to analyze the fact tables that reference dimension tables 158. The analysis computing device 160 can be configured to measure the use of resources to maintain a content item managed by an ECM architecture 102 based on the relation information stored by in the dimension tables 158.

The dimension tables 158 can be associated with one or more dimensions. For example, the dimensions can include sites at which content is accessed from, process types performed by the ECM 102, the individual content items accessed, the file size of the content items accessed, the file type of the content items accessed, the date and/or time of the content items accessed, the task type of the task performed on the ECM 102, the individual user identity of the user accessing the content item, the duration of the access of the content item, the state of the content item, the state of the ECM 102, the state of one or more components of the ECM 102, the assignee of the content item, the author of the content item, the priority level of the content item, the priority level of the task performed, or the like.

Other dimensions used for measuring the use of content and/or resources can include the geo-location of the accessing device, the type of the accessing device, the time of day at which content is accessed, the day of the week at which content is accessed, whether content is accessed off-hours, the role of the user accessing the content, or the like.

Dimensions can include the search terms used by users to find content items on the CMS 104, the frequency of use of the search terms, the relevance of the search terms to the content item selected by the user after the search, or the like.

The analysis computing device 160 can be configured to assign values of a usage metric to the content item and/or a resource of the ECM 102, based on the measured use of the content item and/or resources used to manage the content item. The values of the usage metric can reflect a frequency of access of the content item and/or resource of the ECM 102, a type of access of the content item and/or resource of the ECM 102, an indication of the type of entity (for example, user, application, computer, or the like) that accesses the content item and/or resource of the ECM 102.

The usage metric can include a variable configured to facilitate reporting of performance of maintaining the content items by the electronic content management system. The usage metric associated with a content item can provide an indication of an entity that created the content item. The usage metric can be based on an activity type associated with a content item. The usage metric can indicate a frequency of read access or right access. The usage metric can indicate whether the content of a content item is accessed or whether metadata is accessed.

The resources assigned a usage metric can include computer resources, human resources, and/or other resources associated with the access, management and maintenance of content items. Resources of the ECM 102 can be assigned to content items and/or resources based on the content metrics assigned to them.

The analysis computing device 160 can be configured to define a database schema for the content items managed by the ECM 102 based on the values of the usage metric assigned to the content items and/or resources used to maintain and manage the content item. In some variations, the reports can be configured to include information on optimizing the use of an ECM. For example, the use of an ECM can be optimized by identifying popular content and loading it into a cache. The reports can provide data to better understand how the ECM is being used and make decisions on efficiency savings.

The database schema can facilitate access to the content item based on the usage metric assigned to the content item and/or the resources used to maintain and manage the content item. The database schema can be configured to increase the efficiency of access to content items. The database schema can be configured to increase the efficiency of access to content items having a usage metric indicative that the content items require increased resources to be maintained compared to other content items.

In some variations, the analysis computing device 160 can be configured to assign users accessing the ECM 102, to user groups. The assignment of users to user groups can be based on at least one shared characteristic of the users. The usage of content items by the user group can be measured. Information about the usage of the content items by the user group can be obtained from the fact tables 154. Database schemas can be generated for the user group based on the usage of content items by user groups.

The shared characteristic of users in a user group can be associated with a location of the users, a rank of the users, roles of the users, security clearance of the users and/or the like. A rank of the users can include a rank within an organization, for example, a military rank, a corporate rank, or the like. A role of the users can include a task performed by the users, or a responsibility of the users.

The defined database schema can cause the generation of tables that include foreign keys linking to tables of a database maintained by an electronic content management system. The foreign keys can be row-specific keys.

Figure 5:
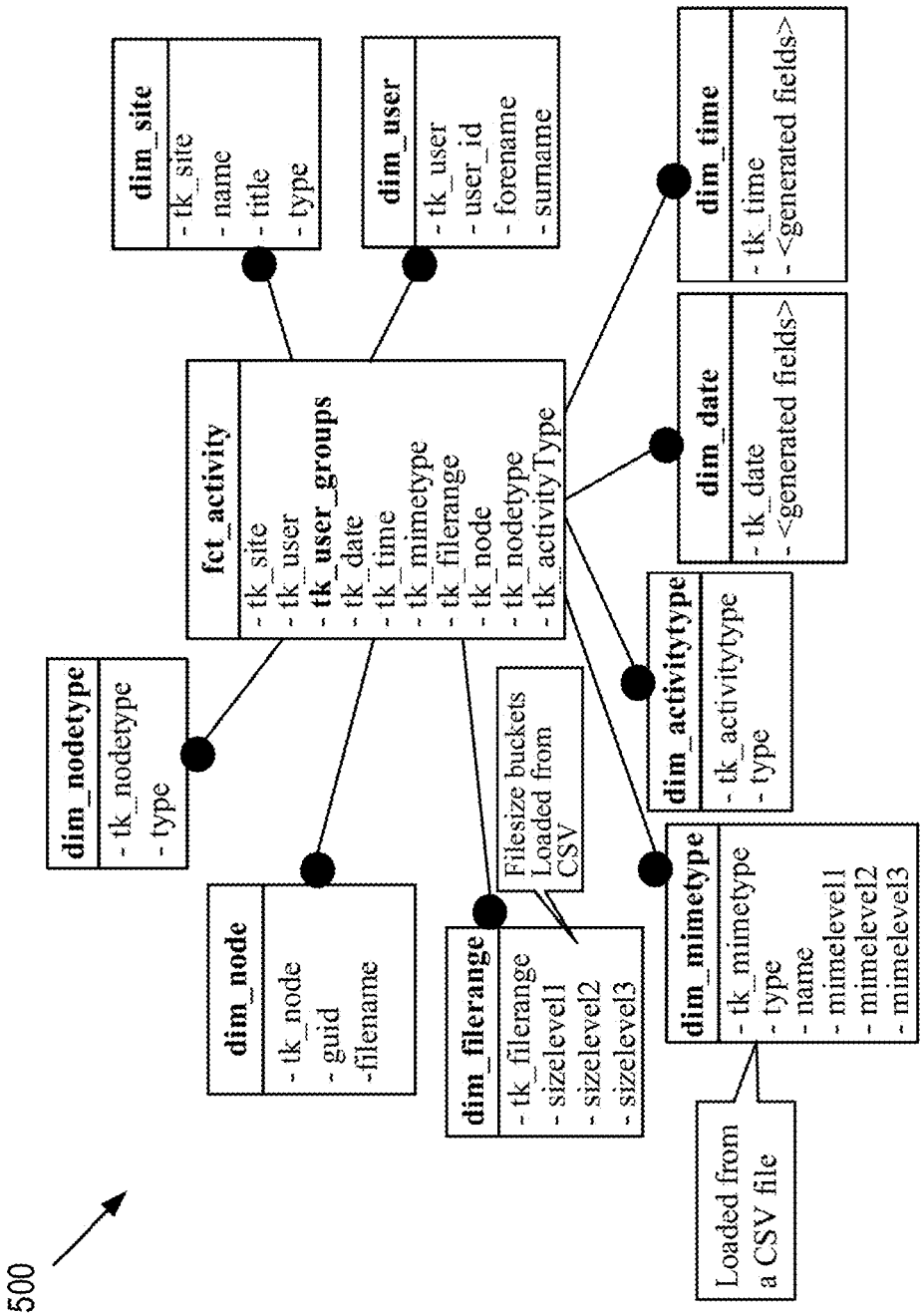
FIG. 5 is an illustration of an example of an database schema format having one or more features consistent with the present description.

FIG. 5 is an illustration of an example of a database schema format 500 having one or more features consistent with the present description.

Figure 6:
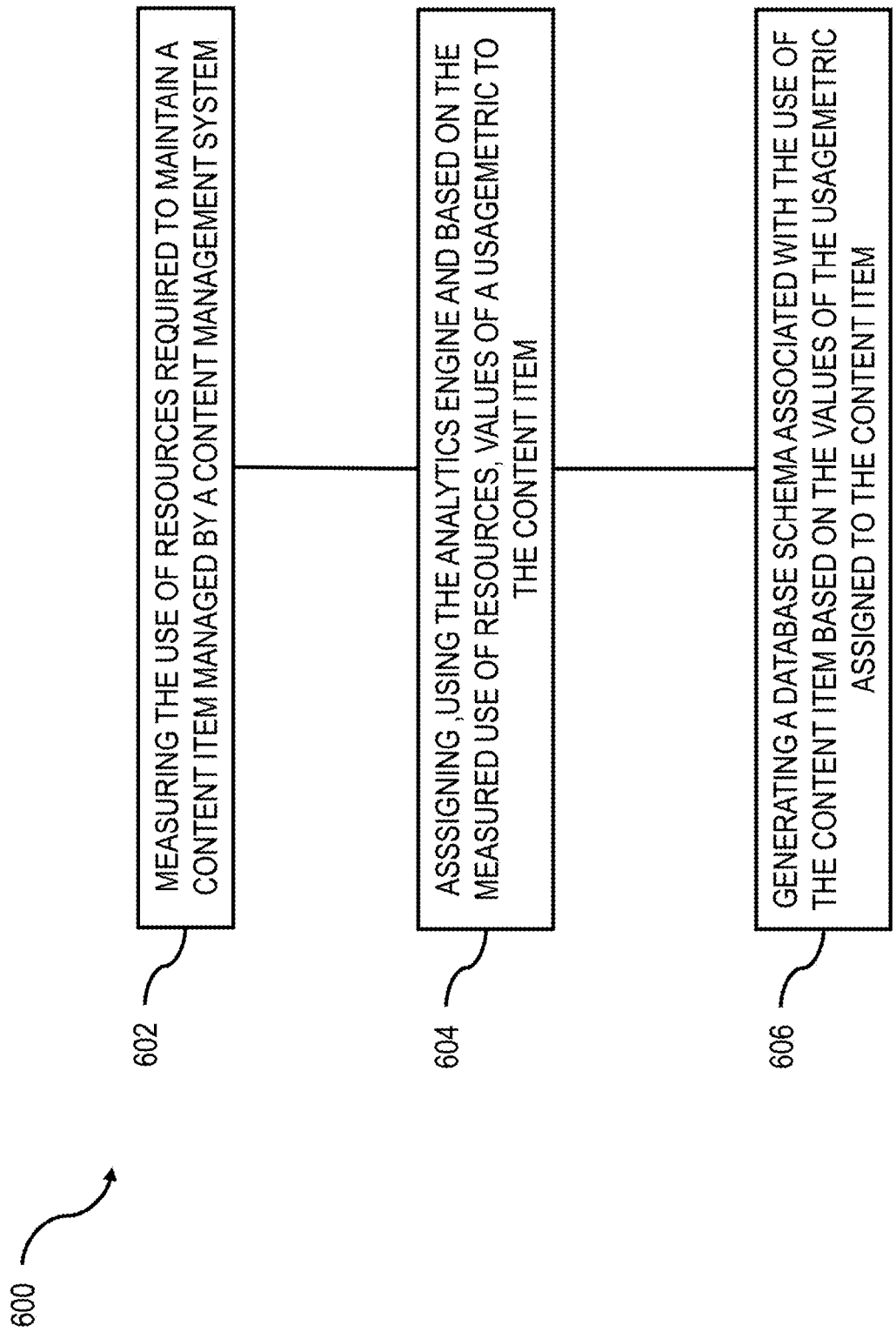
FIG. 6 shows a process flow diagram illustrating features that can be included in a method consistent with implementations of the present description.

FIG. 6 shows a process flow diagram 600 illustrating features that can be included in a method consistent with implementations of the present description. The method can be executed by one or more processors and by one or more elements as described herein. While operations are described herein in a discrete manner, it is contemplated that the method may include one or more additional or fewer operations. Furthermore, operations can be combined or separated. The operations described herein can be performed by one or more processors. The operations described herein can be performed by multiple processors logically and/or physically co-located or logically and/or physically separated.

At 602, the use of resources required to maintain a content item managed by an electronic content management system can be measured.

At 604, values of a usage metric can be assigned to the content items based on the measured use of resources. The usage metric can provide an indication of the resources required to maintain the content items. The usage metric can have one or more variables configured to facilitate reporting of performance of maintaining the content items. The usage metric can be associated with a content item provides an indication of an entity that created the content item. In some variations, resources can include computer resources, human resources, a combination of human resources and computer resources, and/or other resources.

At 606, a database schema can be defined for the content item based on the values of the usage metric assigned to the content item. The database schema can facilitate access to the content item based on the usage metric assigned to the content item. The database schema can be configured to increase the efficiency of access to content items having a usage metric indicative that the content item requires increased resources to be maintained compared to other content items. Increasing the efficiency of access to content items can be based on a location of the users of the content item, cache requirements, device-type that accesses the content items, dependency on other items, or the like.

In some variations, at, or prior to, step 604, users of the at least one computing device can be assigned to user groups based on at least one shared characteristic of the users. To assign user groups, the usage by user groups of content items can be measured. The shared characteristic of users in a user group can be associated with a location of the users, a rank(s) of the users, a role(s) of the users, a security clearance level of the users, demographics of the users, or the like.

The generation of a database schema at step 606, can include generation of a user group database schema for the content items. The user group database schema can be based on the usage of content items by the user group.

Various implementations of the current subject matter can, among other possible benefits and advantages, provide a database schema configured to reduce the cost of maintaining, managing, receiving and delivering content items by an electronic content management system. The database schema can be generated based on an analysis of the use of the content items maintained by the electronic content management system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean "based at least in part on" such that an unrecited feature or element is also permissible.

Other implementations than those described herein may be within the scope of the following claims.

What is claimed is:

1. A computer-implemented method to support efficient access to a content management system, the method comprising:
   receiving data associated with use of a content item in a content management system;
   measuring use of storage resources of the content management system for maintaining the content item in one or more storage locations associated with the content management system;
   measuring use of processing resources of the content management system for processing the content item using one or more applications executed on or associated with the content management system;
   assigning one or more usage metrics to the content item based on the storage resources and the processing resources for storing and processing the content item;
   generating at least one database schema for a database of the content management system used for storing the content item based on the one or more usage metrics;
   implementing the at least one database schema over the content management system by applying an optimization analysis to the at least one database schema taking into account at least one of access frequency to the content item, location of one or more users accessing the content item, availability of the processing resources, and the availability of the storage resources;
   increasing, via the at least one database schema, access efficiency to the content item in response to a usage metric that is assigned to the content item, the usage metric indicating an increase in the processing resources and the storage resources, compared to other content items maintained by the content management system;
   assigning resources to a user group based on the usage metric assigned to the content item; and
   increasing the access efficiency to the content item based on a device type, a location of the user group and cache requirements.

2. The computer-implemented method of claim 1, further comprising:
   assigning the usage metric to the content item based on a measured use of the storage resources or the processing resources, wherein the at least one database schema facilitates access to the content item based on the usage metric assigned to the content item.

3. The computer-implemented method of claim 1, wherein the at least one database schema is configured to provide reliable access to the content item, in response to detecting the usage metric indicative of the content item requiring increased access to at least one of content management system storage or the processing resources.

4. The computer-implemented method of claim 3, wherein the usage metric associated with the content item provides an indication of an entity that created the content item.

5. The computer-implemented method of claim 1, wherein the storage resources or the processing resources include human resources.

6. The computer-implemented method of claim 1, further comprising:
   assigning users of the content management system to a user group based on at least one shared characteristic of the users, the at least one shared characteristic including a location of the users, a role of the users and a security clearance of the users;
   measuring a usage, of the content item, by the user group; and,
   generating a user group database schema for the content item based on the usage of the content item by the user group.

7. The computer-implemented method of claim 6, wherein the at least one shared characteristic includes a location of the users.

8. The computer-implemented method of claim 6, wherein the at least one shared characteristic includes a rank of the users.

9. The computer-implemented method of claim 6, wherein the at least one shared characteristic includes a role of the users.

10. The computer-implemented method of claim 1, further comprising:
    generating a first database schema having a plurality of dimensions for a plurality of user groups in a first organization, the first database schema being optimized based on use of the content item by one or more members of the plurality of user groups and a first usage metric assigned to the content item based on an analysis of access frequency and popularity of the content item being accessed by the users of the first organization; and generating a second database schema having a plurality of dimensions for a plurality of user groups in a second organization, the second database schema being optimized based on use of the content item by one or more members of the plurality of user groups and a second usage metric assigned to the content item based on an analysis of access frequency and popularity of the content item being accessed by the users of the second organization.

11. A computer-implemented system comprising:
an analytics engine configured to perform one or more operations, the operations comprising:
receiving data associated with use of a content item in a content management system;
measuring a use of content management system resources required for maintaining the content item maintained in the content management system, the maintaining the content item including at least storing the content item in a database and processing the content item in response to interactions with one or more application processes operating on the content management system;
assigning values of a usage metric to the content item, the usage metric providing an indication of the content management system resources required for maintaining the content item;
generating a database schema for a database of the content management system, the database schema being defined based on the use of the content item and the values of the usage metric assigned to the content item and being configured to reduce the use of the content management system resources required to maintain the content item;
transmitting the database schema to the content management system for implementation in the database of the content management system;
increasing, via the database schema, access efficiency to the content item in response to the usage metric that is assigned to the content item, the usage metric indicating an increase in processing resources of the content management system and storage resources of the content management system, compared to other content items maintained by the content management system;
assigning resources to a user group based on the usage metric assigned to the content item; and
increasing the access efficiency to the content item based on a device type, a location of the user group and cache requirements.

12. The system of claim 11, wherein the database schema facilitates access to the content item based on the usage metric assigned to the content item.

13. The system of claim 11, wherein the usage metric associated with a content item provides an indication of an entity that created the content item.

14. The system of claim 11, wherein the content management system resources include computer resources.

15. The system of claim 14, wherein the content management system resources include human resources.

16. A computer program product comprising a non-transitory machine-readable medium storing instructions that, when executed by at least one programmable processor, cause the at least one programmable processor to perform operations comprising:
receiving data associated with use of a content item in a content management system;
measuring use of storage resources of the content management system for maintaining the content item in one or more storage locations associated with the content management system;
measuring use of processing resources of the content management system for processing the content item using one or more applications executed on or associated with the content management system;
assigning one or more usage values to the content item based on the storage resources and the processing resources for storing and processing the content item;
generating at least one database schema for a database of the content management system used for storing the content item based on the one or more usage values;
applying an optimization analysis to the at least one database schema;
increasing, via the at least one database schema, access efficiency to the content item in response to a usage metric that is assigned to the content item, the usage metric indicating an increase in the processing resources and the storage resources, compared to other content items maintained by the content management system;
assigning resources to a user group based on the usage metric assigned to the content item; and
increasing the access efficiency to the content item based on a device type, a location of the user group and cache requirements.

17. The computer program product of claim 16, wherein the at least one database schema facilitates access to the content item based on the usage metric assigned to the content item.

18. The computer program product of claim 16, wherein the at least one database schema is configured to provide reliable access to the content item, in response to detecting the usage metric indicative of the content item requiring increased access to at least one of content management system storage or the processing resources.

19. The computer program product of claim 18, wherein the usage metric associated with the content item provides an indication of an entity that created the content item.

* * * * *